(12) United States Patent
Gim et al.

(10) Patent No.: US 9,358,762 B2
(45) Date of Patent: Jun. 7, 2016

(54) LAMINATION APPARATUS WITH AIR PRESSURE AND METHOD FOR NON-CONTACT LAMINATION USING LAMINATION APPARATUS

(71) Applicant: Samsung Display Co., Ltd., Yongin, Gyeonggi-Do (KR)

(72) Inventors: Hye-Young Gim, Jeonju-si (KR); Chul-Hwan Park, Asan-si (KR); Jun Namkung, Asan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 421 days.

(21) Appl. No.: 13/792,559

(22) Filed: Mar. 11, 2013

(65) Prior Publication Data

US 2014/0096904 A1    Apr. 10, 2014

(30) Foreign Application Priority Data

Oct. 9, 2012 (KR) .................. 10-2012-0111705

(51) Int. Cl.
   *B29C 65/00*   (2006.01)
   *B32B 37/00*   (2006.01)
   *B32B 37/10*   (2006.01)
   *B32B 37/12*   (2006.01)

(52) U.S. Cl.
   CPC .................. *B32B 37/10* (2013.01); *B32B 37/12* (2013.01); *B32B 2037/1072* (2013.01)

(58) Field of Classification Search
   CPC .. B29C 65/00; B29C 66/00145; B32B 37/00; B32B 37/10
   USPC .......................................... 156/285, 286, 382
   See application file for complete search history.

(56) References Cited

U.S. PATENT DOCUMENTS

| 2003/0178134 A1* | 9/2003 | Muramoto et al. ........... 156/285 |
| 2004/0108075 A1* | 6/2004 | Choo et al. .................... 156/510 |
| 2009/0277578 A1* | 11/2009 | Sung et al. .................... 156/285 |

FOREIGN PATENT DOCUMENTS

| JP | 11-170739 | 6/1999 |
| KR | 10-2006-0089543 | 8/2006 |
| KR | 10-2006-0130951 | 12/2006 |
| kR | 10-2007-0063968 | 6/2007 |

* cited by examiner

*Primary Examiner* — Michael N Orlando
*Assistant Examiner* — Matthew Hoover
(74) *Attorney, Agent, or Firm* — Robert E. Bushnell, Esq.

(57) ABSTRACT

A lamination apparatus, including: a substrate support; an adhesive film support that is disposed so as to be spaced from the substrate support; an air injection head that is disposed on a co-plane with the adhesive film support so as to be spaced apart from the substrate support or disposed so as to be further spaced apart from the substrate support than the adhesive film support; an air pump that supplies air to the air injection head; an air supply pipe that connects the air injection head with the air pump, wherein the air injection head includes an ion generation unit.

12 Claims, 7 Drawing Sheets

LAMINATION APPARATUS WITH AIR PRESSURE AND METHOD FOR NON-CONTACT LAMINATION USING LAMINATION APPARATUS

CLAIM PRIORITY

This application makes reference to, incorporates the same herein, and claims all benefits accruing under 35 U.S.C. §119 from an application earlier filed in the Korean Intellectual Property Office on 9 Oct. 2012 and there duly assigned Serial No. 10-2012-0111705.

TECHNICAL FIELD

The present disclosure relates to a lamination apparatus and a lamination method using the same.

BACKGROUND OF THE INVENTION

With the development of information-oriented societies, research into a flat display device meeting various demands has been gradually increased. As the flat panel display, there are a plasma display panel (PDP), a liquid crystal display (LCD), an organic light emitting diode display (OLED), and the like. In particular, the OLED has advantages of lightness, thinness, and low power consumption and therefore, has been in the limelight as a next-generation display and the LCD has advantages of a large area and a long lifespan and therefore, has been prevalently used.

The above information disclosed in this Related Art section is only for enhancement of understanding of the background of the invention and therefore it may contain information that does not form the prior art that is already known to a person of ordinary skill in the art.

SUMMARY OF THE INVENTION

The present disclosure has been made in an effort to provide a lamination apparatus capable of forming a uniform adhesive layer while reducing static electricity generated by a lamination method using a roller according to the related art and a lamination method using the same.

An exemplary embodiment of the present disclosure provides a lamination apparatus, including: a substrate support; an adhesive film support that may be disposed so as to be spaced from the substrate support; an air injection head that may be disposed on a co-plane with the adhesive film support so as to be spaced apart from the substrate support or disposed so as to be further spaced apart from the substrate support than the adhesive film support; an air pump that supplies air to the air injection head; an air supply pipe that connects the air injection head with the air pump, wherein the air injection head includes an ion generation unit.

The ion generation unit may include: a voltage applying unit that applies voltage; and an electrode unit that may be connected with the voltage applying unit to generate ions.

The substrate support may be provided with a moving member that moves the substrate support.

The substrate support may be provided with a fixing member that fixes the substrate.

The substrate support may be provided with a rotating member that rotates the substrate support.

The air injection head may be provided with a moving member that moves the air injection head.

The lamination apparatus further comprising: a moving member for driving the adhesive film support.

Another exemplary embodiment of the present disclosure provides a lamination method, including: disposing a substrate on a substrate support; disposing the adhesive film on the adhesive film support; bonding the bonded surface of the substrate to the adhesive layer of the adhesive film so as to face each other; and injecting air to the adhesive film to apply the air pressure.

The disposing of the adhesive film may be performed earlier than the disposing of the substrate.

The disposing of the substrate may include: fixing the substrate to the substrate support; and rotating the substrate support to invert the substrate.

The disposing of the adhesive film may include fixing the adhesive film on the adhesive film support.

The bonding may include controlling an angle of the adhesive film support to bond the adhesive layer of the adhesive film to the substrate.

The applying may include: sequentially separating the adhesive film from the adhesive film support; and applying air pressure to the separated adhesive film.

The air injected in the applying may include an ionized gas molecule and the ionized gas molecule may be 10 vol % to 50 vol % of the injected air.

The air pressure injected in the applying may be in a range between 0.2 Mpa and 0.5 Mpa, based on the injection surface of air.

An injection angle of air injected in the applying may be in a range between 45° and 90° with respect to a surface of the substrate.

According to the lamination apparatus with air pressure and the method for non-contact lamination using the lamination apparatus of the exemplary embodiment of the present disclosure, it is possible to uniformly perform the lamination process, regardless of the flexures or the steps that are formed on the substrate.

Further, it is possible to remove static electricity that may be generated during the process, by injecting the mixed gas of air and ion.

In addition, it is possible to remove bubbles, foreign materials, and the like, that may be generated during the process, by injecting the mixed gas with a predetermined pressure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, a lamination apparatus with air pressure and a lamination method with air pressure according to an exemplary embodiment of the present disclosure will be described in detail with reference to the accompanying drawings. However, the scope of the present disclosure is not limited to the following embodiments or drawings and those skilled in the art can variously implement the present disclosure without departing from the technical spirit of the present disclosure.

In the specification, specific structural and functional descriptions are only illustrated for explaining exemplary embodiments of the present disclosure and the exemplary embodiments of the present disclosure may be practiced in various forms. Further, it is to be understood that all changes, equivalents, and substitutes are included in the spirit and technical scope of the present disclosure.

For reference, each component and shape are briefly illustrated or exaggeratedly illustrated in the drawings so as to help understanding. Components denoted by like reference numerals in the drawings refer to like components.

In the specification, it is to be understood that when one element is referred to as being "connected to" or "coupled to" another element, it may be connected directly to or coupled directly to another element or be connected to or coupled to another element, having the other element intervening therebetween.

It is to be understood that when one element is referred to as being "on" or "below" another element, it may be directly coupled "on" or "below" another element or be connected "on" or "below" another element, having the other element intervening therebetween.

A flexible display in which various flat panel displays may be implemented on a flexible substrate. The flexible display may be slim and light as well as can be manufactured in various forms by being warped or bent and thus, has been currently evaluated as a next-generation technology of a flat panel display market.

In order to prevent visibility from being degraded due to external light reflection such as sunlight, a process of manufacturing a flat panel display may include bonding a polarizer or a polaroid film to a top of an encapsulation layer of the flat panel display.

Further, the process of manufacturing a flat panel display may include bonding a plastic film serving to support a display to the display so as to implement a flexible function while supporting the display.

The process of manufacturing a flat panel display may include forming an adhesive layer for bonding the polarizer, the polaroid film, and the plastic film. The adhesive layer may be formed using an adhesive film in which an adhesive layer may be disposed on a film base.

A display surface on which the adhesive layer may be formed and the adhesive layer of the adhesive film are disposed to face each other and are then bonded to each other with a predetermined pressure. Next, the adhesive layer may be formed on the display surface by a method of separating only the film base.

As a method of applying a predetermined pressure, the related art has used a method of using a roller. However, a pressing method using a roller may generate static electricity due to a frictional force due to a roller, such that the static electricity may damage a display.

When a bonded surface of the flat panel display is not flat but has a step or foreign materials are bonded to the roller, the adhesive layer is not uniform, such that adhesive defect may be caused.

An exemplary embodiment of the present disclosure is to form an adhesive layer, which is hereinafter referred to as a bonded surface of a substrate on which the adhesive layer is formed. Further, as the substrate, there may be a flat panel display, a flexible display panel, a transparent display panel, and the like.

According to the exemplary embodiment of the present disclosure, in order to form an adhesive layer on one surface of the substrate, a process of bonding an adhesive film with an adhesive layer formed on a bonded surface of the substrate is referred to as a lamination process. In addition, the lamination process generally used in the art may correspond to the lamination process of an exemplary embodiment of the present disclosure.

The adhesive film may include a base and an adhesive layer formed on one surface of the base. The base may be made of flexible materials such as PET, polymer film and as the adhesive layer, an acrylic adhesive, a urethane adhesive, and the like, may be used. The bonded surface of the substrate and the adhesive layer of the adhesive film may be bonded to face each other.

The lamination process may be performed within a vacuum chamber. The vacuum chamber may serve to block the substrate from the outside so that the substrate, and the like, is not polluted during the process. The vacuum chamber may include an air discharge unit for discharging air introduced into the chamber.

Figure 1:
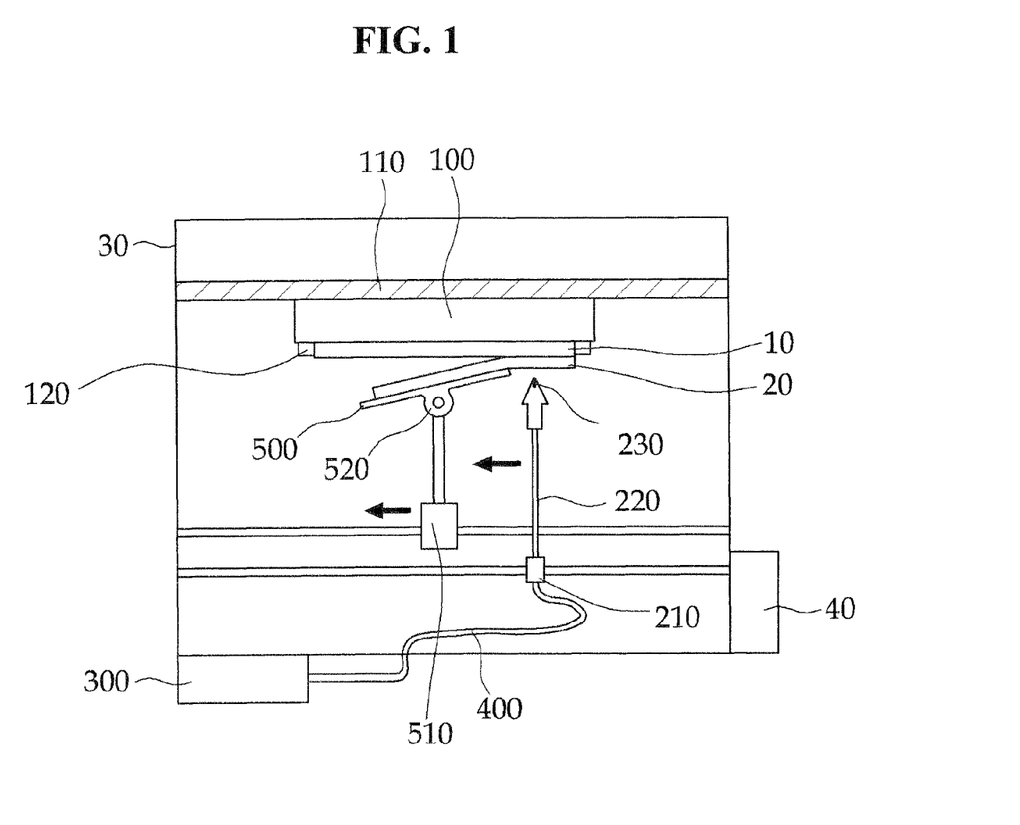
FIG. 1 is a diagram illustrating a lamination apparatus with air pressure according to an exemplary embodiment of the present disclosure.

According to FIG. 1, the lamination process is performed within a vacuum chamber 30. The vacuum chamber 30 serves to block the substrate from the outside so that the substrate, and the like, is not polluted during the process. The vacuum chamber 30 includes an air discharge unit 40 for discharging air introduced into the chamber.

FIG. 1 is a diagram illustrating a lamination apparatus with air pressure according to an exemplary embodiment of the present disclosure.

The lamination apparatus may include a substrate support 100 that supports a substrate 10, an adhesive film support 500 that may be disposed under the substrate support 100 so as to be spaced apart each from and supports the adhesive film, an air injection head 200 that may be spaced apart from the substrate support 100 and the adhesive film support 500 and may be disposed under the adhesive film support 500, an air pump 300 that supplies compressed air to the air injection head 200, and an air supply pipe 400 that connects the air injection head 200 with the air pump 300.

The substrate support 100 may be provided with a moving member 110 that may move the substrate support 100 in one direction, a fixing member 120 that fixes the substrate 10, and a rotating member (not illustrated) that rotates the substrate support 100.

FIG. 1 illustrates a state in which the substrate support 100 is inverted by the rotating member. The substrate 10 may be disposed on the substrate support 100 and then, may be fixed by the fixing member 120. Next, the rotating member may invert the substrate support 100 according to the process step.

The fixing member 120 may serve to fix the substrate 10 when the substrate support 100 is inverted by rotation. Further, during the lamination process, it is possible to prevent the substrate 10 from being pushed due to air pressure injected by the air injection head 200.

The substrate support 100 may be provided with the moving member 110 that may move the substrate support 100 in one direction. Further, the air injection head 200 may be provided with a moving member 210 that may move the air injection head 200 in one direction.

The substrate support moving member 110 and the air injection head moving member 210 may be alternatively disposed or both thereof may be disposed. Hereinafter, the exemplary embodiment of the present disclosure is described under the precondition that the air injection head moving member 210 may be disposed.

The air injection head moving member 210 may move the air injection head 200 in one direction while air is injected from the air injection head 200. FIG. 1 illustrates that the air injection head 200 moves from the right to the left in the drawing, but the exemplary embodiment of the present disclosure is not necessarily limited thereto and therefore, the air injection head 200 can move from the left to the right or move diagonally.

The air injection head 200 may include an air inlet 220 into which air may be injected from the air supply pipe 400 and an air outlet 230 from which the injected air may be discharged.

FIG. 1 illustrates the air outlet 230 having a slit shape, but the exemplary embodiment of the present disclosure is not necessarily limited thereto and therefore, a shape of the air outlet 230 may have various shapes, such as a circular shape, a surface shape, and the like.

The air injection head 200 may serve to inject compressed air supplied from the air pump 300 with a predetermined pressure.

As the compressed air supplied from the air pump 300, gases such as clean dry air (CDA), nitrogen ($N_2$), dioxide carbon ($CO_2$), and the like, may be used.

The air injection head 200 injects the compressed air to the adhesive film 20 to provide a predetermined pressure, such that the substrate 10 may be bonded to the adhesive film 20.

The air pressure injected from the air injection head 200 may be controlled so as to form a uniform adhesive layer on the substrate 10 with flexures or steps without damaging the substrate 10.

That is, the air pressure injected from the air injection head 200 may be changed according to a kind of the substrate, flexion of a surface of the substrate, and the like.

For example, when the substrate 10 is a thin film encapsulated display, the air pressure injected from the air injection head 200 needs to have a pressure condition enough to form a uniform adhesive layer on a surface of the display with steps without damaging the flexible display. The air pressure satisfying the condition may have a value ranging from 0.2 Mpa to 0.5 Mpa, based on the injection surface.

Further, it is possible to remove bubbles or foreign materials that may be generated during the process, by using the air pressure injected from the air injection head 200.

The adhesive film support 500 that supports the adhesive film 20 may be disposed under the substrate support 100 so as to be spaced from each other.

The adhesive film support 500 may be connected with a moving member 510 that may move the adhesive film support 500 in one direction and a rotating shaft 520 that may control a support angle of the adhesive film support 500. Further, the adhesive film support 500 may be provided with an adsorption member (not illustrated) that fixes the adhesive film.

The adsorption member may fix the adhesive film to the adhesive film support 500 or control the adsorbed portion to sequentially separate the adhesive film from the adhesive film support 500.

FIG. 1 illustrates that the adhesive film support moving member 510 moves from the right to the left, but the exemplary embodiment of the present disclosure is not necessarily limited thereto and therefore, the adhesive film support moving member 510 may move from the left to the right or move diagonally.

FIG. 1 illustrates that the adhesive film support 500 and the adhesive film support moving member 510 are disposed left over the air injection head 200 and the air injection head moving member 210, but the exemplary embodiment of the present disclosure is not necessarily limited thereto, and therefore, the adhesive film support 500 and the adhesive film support moving member 510 may be disposed at the right of the air injection head 200 and the air injection head moving member 210.

Figure 2:
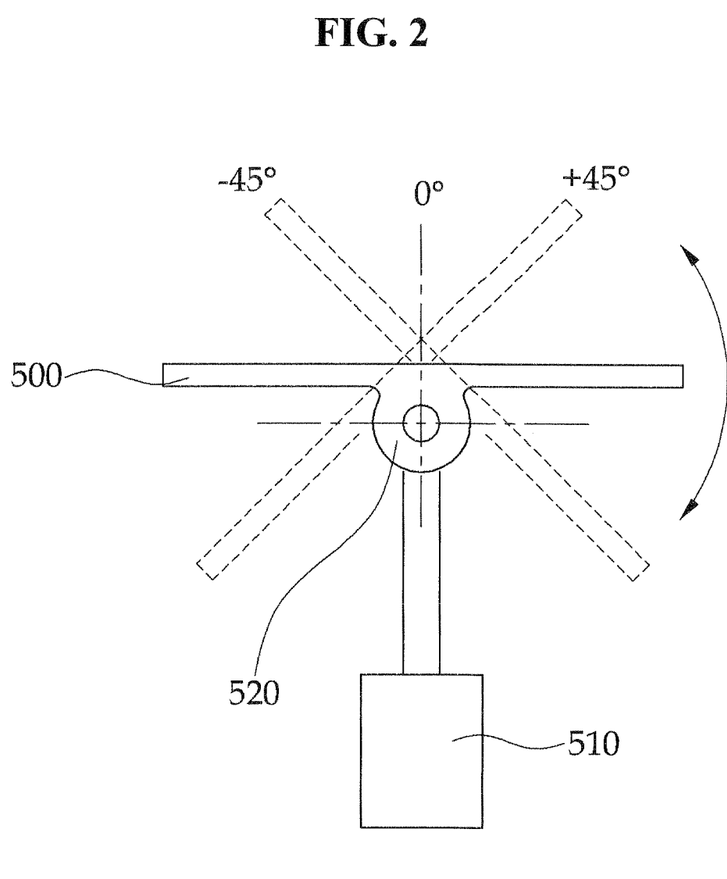
FIG. 2 is a diagram illustrating an adhesive film support and a rotating angle according to the exemplary embodiment of the present disclosure.

FIG. 2 is a diagram illustrating the adhesive film support 500 and a rotating angle according to the exemplary embodiment of the present disclosure. The adhesive film support 500 may be provided with the rotating shaft 520 for controlling an angle of the adhesive film support 500. As illustrated in FIG. 2, the rotating shaft 520 may control the angle of the adhesive film support 500 within a range between −45° and +45°.

Figure 3:
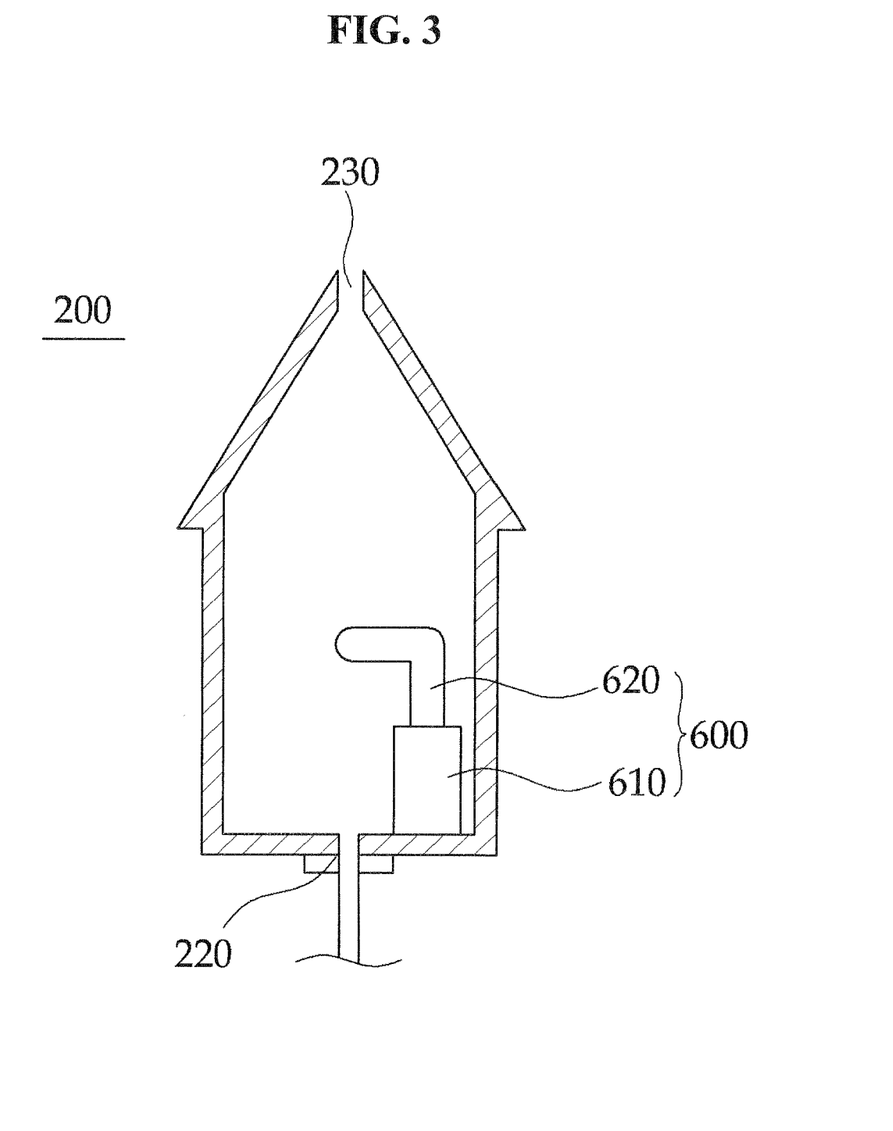
FIG. 3 is a cross-sectional view of an air injection head according to the exemplary embodiment of the present disclosure.

FIG. 3 is a cross-sectional view of the air injection head according to the exemplary embodiment of the present disclosure.

The air injection head 200 may include an air inlet 220 into which air may be injected from the air supply pipe 400, an air outlet 230 from which the injected air may be discharged, and an ion generation unit 600 that generates ions.

The ion generation unit 600 may include a voltage applying unit 610 that applies voltage and at least one electrode unit 620 that discharges the applied voltage and generates multiple ions.

The voltage applying unit 610 may be electrically connected with a voltage source (not illustrated) that is configured at the outside to apply voltage to the electrode unit 620. The voltage applying unit 610 serves to apply voltage according to the supplied voltage. That is, it is possible to control the generated amount of ions by controlling the voltage supplied to the voltage applying unit 610.

When voltage is applied from the voltage applying unit 610, the electrode unit 620 may discharge the voltage to generate positive ions and negative ions.

Both of the positive ions and the negative ions may be injected by carrying on the injected air when air is injected from the air injection head 200. Generally, ionized gas may occupy 10 vol % to 50 vol % of the overall air injected from the air injection head 200.

The injected ion may serve to remove static electricity that may be generated during the lamination process. In more detail, when the substrate 10 has positive static electricity, the positive ions injected from the air injection head 200 are repulsive and pushed and are combined with negative ions to be neutralized.

Similarly, when the substrate 10 has negative static electricity, the negative ions injected from the air injection head 200 are repulsive and pushed and are combined with positive ions to be neutralized.

Figure 4:
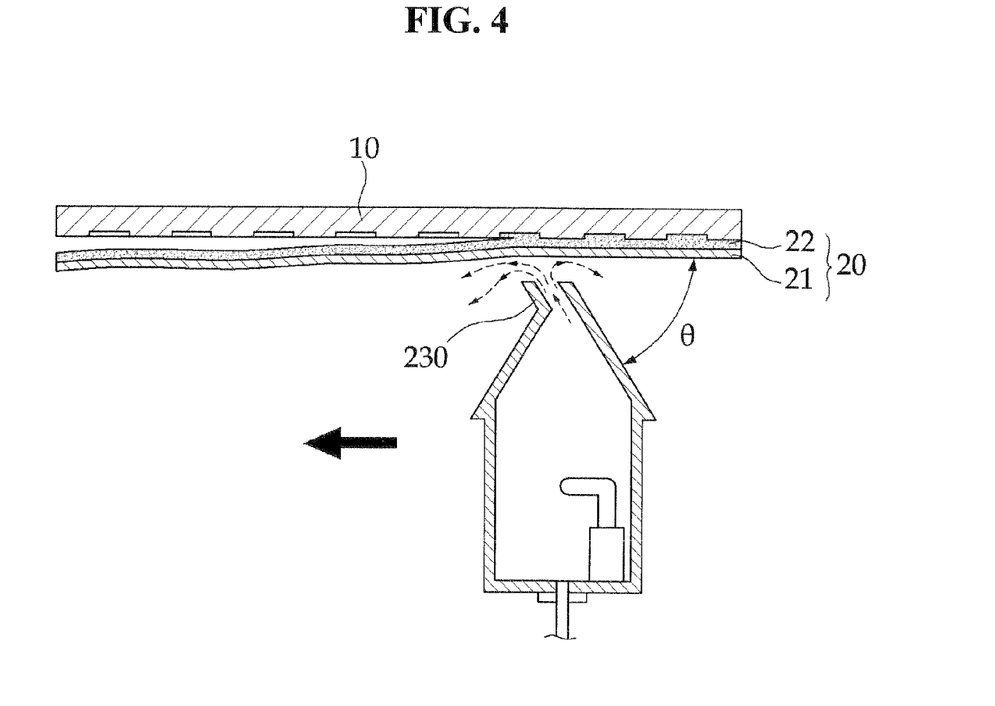
FIG. 4 is a diagram illustrating an injection angle of air injected from the air injection head according to the exemplary embodiment of the present disclosure.

FIG. 4 is a diagram illustrating an injection angle of air injected from the air injection head according to the exemplary embodiment of the present disclosure.

As illustrated in FIG. 4, in the exemplary embodiment of the present disclosure, an angle formed by the substrate 10 and air discharged through the air injection head 200 is referred to as an injection angle θ.

The air outlet 230 of the air injection head 200 may be controlled so that the injection angle may have a value ranging from 0° to 90°. In another exemplary embodiment of the present disclosure, the air injection head 200 may be controlled to have the injection angle. The injection angle may preferably have a value between 45° and 90°.

It is possible to easily remove bubbles or foreign materials that are present between the substrate 10 and the adhesive film 20, by controlling the injection angle to a value between 45° and 90°.

FIGS. 5A to 5D are diagrams illustrating a lamination method with air pressure according to the exemplary embodiment of the present disclosure.

The lamination method with air pressure may include disposing the substrate on the substrate support, disposing the adhesive film on the adhesive film support, bonding the bonded surface of the substrate to the adhesive layer of the adhesive film so as to face each other, and applying air pressure to the adhesive film.

The disposing of the adhesive film may be performed earlier than the disposing of the substrate.

Figure 5A:
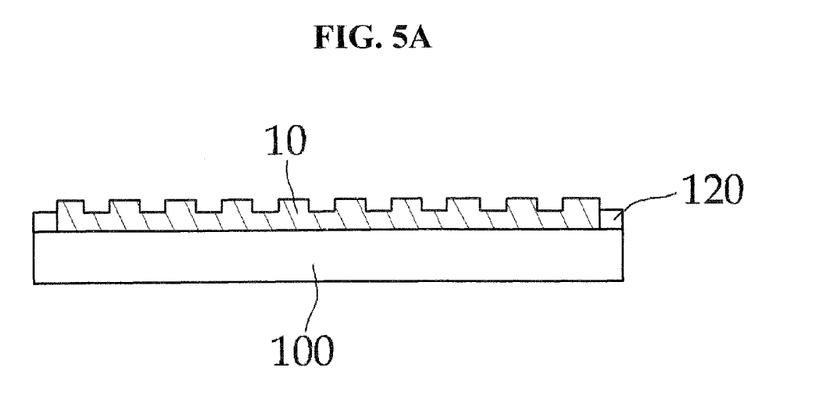
FIGS. 5A to 5D are diagrams illustrating a lamination method with air pressure according to the exemplary embodiment of the present disclosure.

Referring to FIG. 5A, the substrate 10 may be disposed on the substrate support 100.

The disposing of the substrate 10 on of the substrate support 100 may include fixing the disposed substrate 10 using the fixing member 120 of the substrate support 100 and rotating the substrate support 100 to invert the substrate 10.

Figure 5B:
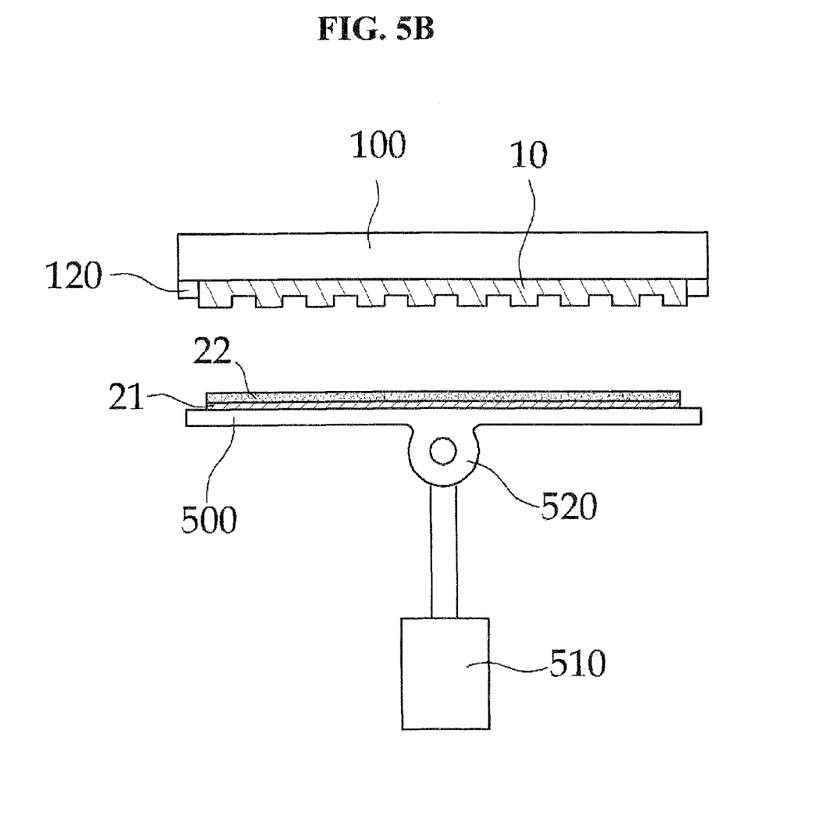

Referring to FIG. 5B, the adhesive film 20 may be disposed on the adhesive film support 500 that may be disposed under the substrate support 100.

The adhesive film 20 may include the base 21 and the adhesive layer 22 that may be formed on one surface of the base 21. The base may be made of flexible materials such as PET, polymer film and as the adhesive layer, an acrylic adhesive, a urethane adhesive, and the like, may be used. The bonded surface of the substrate 10 and the adhesive layer 22 of the adhesive film 20 may be disposed to face each other.

The disposing of the adhesive film 20 on the adhesive film support 500 may include fixing the adhesive film 20 on the adhesive film support 500. The adhesive film 20 may be fixed by the adsorption member (not illustrated) that may be disposed on the adhesive film support 500. The adsorption member may fix the adhesive film 20 to the adhesive film support 500 by using the air pressure and may sequentially block the air pressure to sequentially separate the adhesive film 20 from the adhesive film support 500.

Figure 5C:
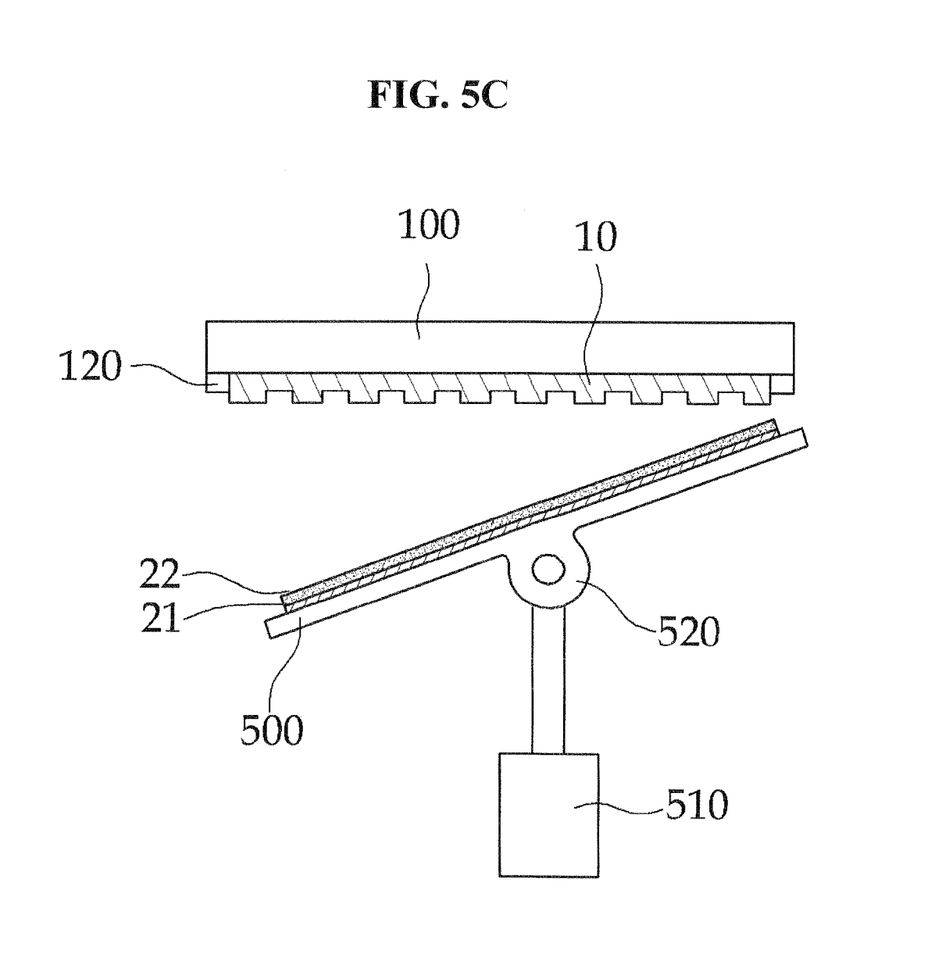

Referring to FIG. 5C, the adhesive layer 22 of the adhesive film 20 may be bonded to the bonded surface of the substrate 10 by controlling the angle of the adhesive film support 500.

The rotating shaft 520 of the adhesive film support 500 may control the angle of the adhesive film support 500 to a range between −45° and +45° as illustrated in FIG. 2.

As illustrated in FIG. 5C, one distal end of the adhesive film 20 may be bonded to the substrate 10 by controlling the rotating shaft 520.

Figure 5D:
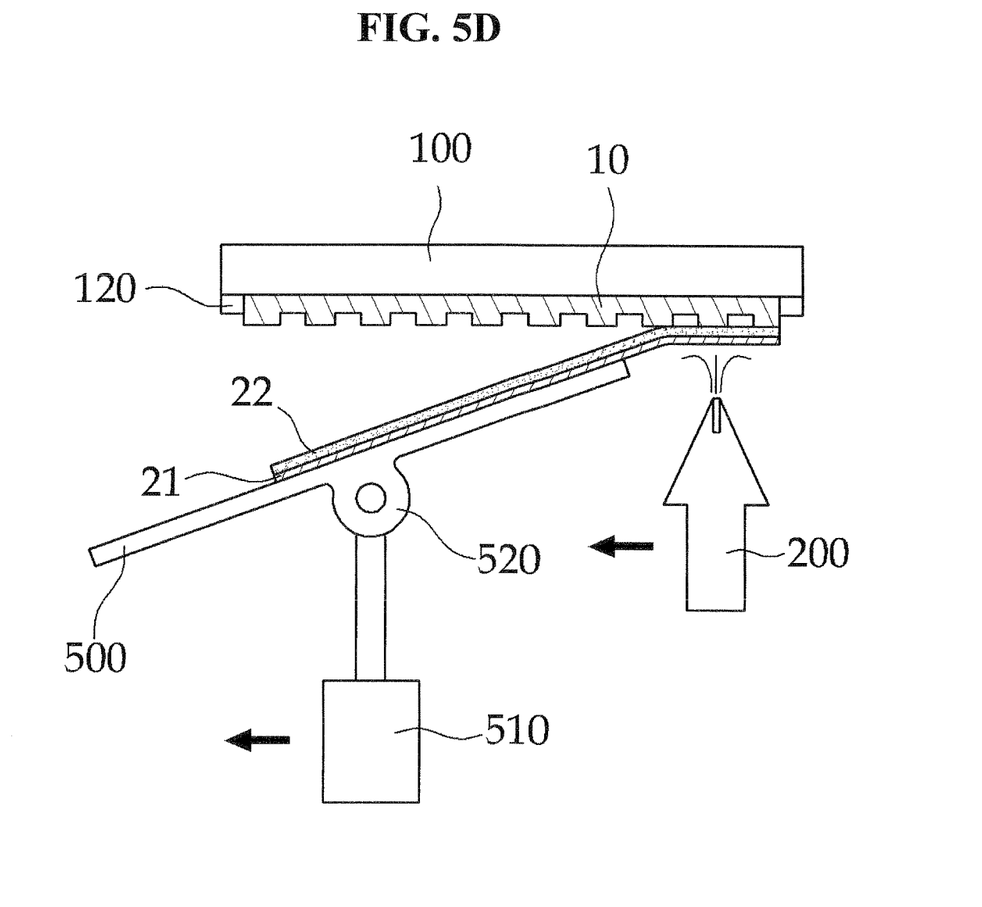

Referring to FIG. 5D, the adhesive film 20 and the adhesive film support 50 may be separated stepwise. The separated adhesive film 20 may be disposed in a state in which the adhesive film 20 may be bonded to the bonded surface of the substrate 10 and a non-contact lamination process may be performed by pressing the separated adhesive film 20 using the air injection head 200.

As illustrated in FIG. 5D, the adhesive film support 500 may be sequentially separated from the adhesive film 20 while moving from the right to the left in the drawing and the air injection head 200 may be sequentially bonded to the separated adhesive film 20.

FIG. 5D illustrates that the air injection head 200 moves from the right to the left in the drawing, but the exemplary embodiment of the present disclosure is not necessarily limited thereto and therefore, the air injection head 200 may uniformly move so that the air injection head 200 may press the entire area of the adhesive film 20.

The pressure applied to the adhesive film 20 by the air injection head 200 may be changed according to a kind of the substrate and the flexion of the surface of the substrate. When the substrate 10 is the flexible display, the pressure may have a value between 0.2 Mpa and 0.5 Mpa, based on the injection surface.

As the air supplied from the air injection head 200, gases such as clean dry air (CDA), nitrogen (N2), dioxide carbon (CO2), and the like, may be used.

Further, when the foregoing gases are injected from the air injection head 200, ionized gases may be injected together. The ionized gases may be formed by an ion generation unit (not illustrated) that may be included in the air injection head 200.

The ionized gases may be injected within a range between 10 vol % and 50 vol % of the overall gas. The injected ion may prevent static electricity that may be generated during the lamination process. A content ratio of the ionized gases may be controlled according to the generated degree of static electricity. That is, the content ratio can be appropriately controlled according to the kind and flexion of the substrate, the kind of the adhesive film, and the working environment.

Further, the injection angle of air by the air injection head 200 may have a value of a range between 45° and 90°, based on the surface of the substrate. It is possible to easily remove bubbles or foreign materials that are present between the substrate 10 and the adhesive film 20, by controlling the injection angle to a value between 45° and 90°.

As described above, the method of non-contact lamination simultaneously injecting air and ion may uniformly bond the substrate to the adhesive film regardless of the presence and absence of steps on the surface of the substrate to form the uniform adhesive layer, unlike the method of using a roller according to the related art.

The ions are injected to prevent static electricity that may be generated during the process, thereby protecting the display.

The foregoing lamination apparatus and the lamination method with air pressure are only example and the protective scope of the preset disclosure may cover various changes and equivalent examples made by a person skilled in the art to which the present disclosure pertains.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lamination apparatus, comprising:
   a substrate support;
   an adhesive film support that is disposed so as to be spaced-apart from the substrate support;

a rotating shaft is affixed to one side of the adhesive film support to control an angle of the adhesive film support relative to the substrate support within a range between −45° and +45°;

an air injection head comprised of an ion generation unit, the air injection head being disposed on a co-plane with the adhesive film support so as to be spaced apart from the substrate support or disposed so as to be further spaced apart from the substrate support than the adhesive film support;

an air pump that supplies air to the air injection head; and an air supply pipe that connects the air injection head with the air pump.

2. The lamination apparatus of claim 1, wherein the ion generation unit includes:

a voltage applying unit that applies voltage; and an electrode unit that is connected with the voltage applying unit to generate ions.

3. The lamination apparatus of claim 1, wherein the substrate support is provided with a moving member that moves the substrate support.

4. The lamination apparatus of claim 1, wherein the substrate support is provided with a fixing member that fixes the substrate.

5. The lamination apparatus of claim 1, wherein the substrate support is provided with a rotating member that rotates the substrate support.

6. The lamination apparatus of claim 1, wherein the air injection head is provided with a moving member that moves the air injection head.

7. The lamination apparatus of claim 1, further comprising:

a moving member for driving the adhesive film support.

8. The lamination apparatus of claim 1, the adhesive film support is a flat rectangular prism that supports an adhesive film.

9. The lamination apparatus of claim 1, further comprising an adhesive film support moving member is attached to the rotating shaft to move the adhesive film support in one direction parallel to the substrate support.

10. The lamination apparatus of claim 1, wherein the air supplied to the air injection head includes ionized gas molecules generated by the ion generation unit, the ionized gas molecules are 10 vol % to 50 vol % of the air supplied.

11. The lamination apparatus of claim 10, wherein the air supplied is at an air pressure in a range between 0.2 Mpa and 0.5 Mpa, based on an injection surface of air.

12. The lamination apparatus of claim 11, wherein an injection angle of air injected by the air injection head is in a range between 45° and 90° with respect to a surface of the support substrate.

* * * * *